(12) United States Patent
Yu et al.

(10) Patent No.: US 12,293,542 B1
(45) Date of Patent: May 6, 2025

(54) SYSTEM AND METHOD TO LOCATE AND LABEL A TRAILER COUPLER

(71) Applicant: GM Global Technology Operations LLC, Detroit, MI (US)

(72) Inventors: Bo Yu, Troy, MI (US); Jiabin Shen, Burnaby (CA); Kamran Ali, Troy, MI (US); Kenneth Weber, Ajax (CA); Guanyang Luo, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/494,231

(22) Filed: Oct. 25, 2023

(51) Int. Cl.
| | |
|---|---|
| G06T 7/73 | (2017.01) |
| B60K 35/10 | (2024.01) |
| B60K 35/28 | (2024.01) |
| B60R 1/26 | (2022.01) |
| G06V 20/56 | (2022.01) |

(52) U.S. Cl.
CPC ............... *G06T 7/73* (2017.01); *B60R 1/26* (2022.01); *G06V 20/56* (2022.01); *B60K 35/10* (2024.01); *B60K 35/28* (2024.01); *B60K 2360/166* (2024.01); *B60K 2360/21* (2024.01); *B60R 2300/808* (2013.01); *G06T 2207/20081* (2013.01); *G06T 2207/30252* (2013.01)

(58) Field of Classification Search
CPC ............ G06T 7/73; G06T 2207/20081; G06T 2207/30252; B60R 1/26; B60R 2300/808; G06V 20/56; B60K 35/10; B60K 35/28; B60K 2360/166; B60K 2360/21
See application file for complete search history.

(56) References Cited

U.S. PATENT DOCUMENTS

| | | | | |
|---|---|---|---|---|
| 2018/0147900 | A1* | 5/2018 | Shank | G06T 7/60 |
| 2019/0381844 | A1* | 12/2019 | Niedert | B60D 1/62 |
| 2021/0347410 | A1* | 11/2021 | Niewiadomski | B60R 1/26 |
| 2022/0084212 | A1* | 3/2022 | Dahal | G06N 3/08 |
| 2022/0147742 | A1* | 5/2022 | El-sawah | G06V 10/454 |
| 2022/0315034 | A1* | 10/2022 | Niewiadomski | B62D 15/025 |
| 2022/0355735 | A1* | 11/2022 | Kroeze | B60W 60/0025 |
| 2023/0143282 | A1* | 5/2023 | Niedert | G01L 5/136 |
| | | | | 280/446.1 |
| 2023/0328490 | A1* | 10/2023 | Brinkman | B60T 8/323 |
| | | | | 340/902 |
| 2024/0359690 | A1* | 10/2024 | Li | G06T 7/74 |

* cited by examiner

*Primary Examiner* — Farzana Hossain
(74) *Attorney, Agent, or Firm* — Vivacqua Crane, PLLC

(57) ABSTRACT

A system and method for locating a trailer coupler on a trailer to assist with the coupling of the trailer coupler to a vehicle hitch on a vehicle. The system includes a human-machine interface, a camera, a global positioning system, a remote computing system, a vehicle-to-infrastructure communication network, controllers, a memory, sensors, and a trailer coupler labeling application. The trailer coupler labeling application includes: sensing at least one of a hitched state and an unhitched state of the trailer coupler, capturing an optical data with the camera when the vehicle hitch is in the hitched and unhitched state, determining a distance of the trailer coupler relative to the camera when the vehicle hitch is in the hitched state, identifying the location of the trailer coupler on an image defined by the captured data and creating a label on the image of the trailer coupler.

20 Claims, 5 Drawing Sheets

SYSTEM AND METHOD TO LOCATE AND LABEL A TRAILER COUPLER

INTRODUCTION

The present disclosure relates to advanced driver assistance systems (ADAS), and more particularly to driver assistance systems that identify a trailer coupler used to couple the trailer to a vehicle. Vehicles are often used to tow trailers to carry equipment, goods, belongings, animals, other vehicles including boats and off-road vehicles, from place to place along roadways. Vehicles are equipped with hitches that removably couple to a trailer coupler of a trailer. The ADAS system needs to correctly identify the position or location of the trailer coupler in order to aid in coupling the trailer to the vehicle. However, the computer vision employed by the ADAS system may have difficultly detecting all different kinds of trailer couplers due to the different colors, types and shapes of the trailer couplers, as well as lighting conditions of the environment around the trailer.

Accordingly, trailer coupler identification systems have been developed to assist in locating the trailer coupler on the trailer. For example, some ADAS systems employ an electronic tag or ID placed on the trailer coupler that is easily identifiable by the vehicle's computer vision system of the ADAS. While current systems and methods for trailer coupler identification achieve their intended purpose, there is a need for a new and improved system and method of providing trailer coupler identification that improves the accuracy of locating the trailer coupler on a trailer from location-to-location while utilizing preexisting hardware, reducing computational burdens, and reducing component complexity while decreasing trailer coupling difficulty, and thereby improving customer confidence and satisfaction.

SUMMARY

According to several aspects of the present disclosure, a system for locating a trailer coupler on a trailer to assist with the coupling of the trailer coupler to a vehicle hitch on a vehicle is provided. The system includes a human-machine interfaces (HMIs) disposed within the vehicle, a camera disposed on the vehicle and detecting an environment surrounding the vehicle, a global positioning system (GPS) including one or more GPS satellites for obtaining a vehicle position information, a remote computing system, a vehicle-to-infrastructure (V2I) communication network, one or more controllers, each of the one or more controllers having a processor, a memory, and one or more input/output (I/O) ports, the I/O ports in communication with the one or more sensors, the one or more HMIs, the GPS, and the remote computing system via the V2I communication network. The memory storing programmatic control logic. The processor executing the programmatic control logic. The programmatic control logic including a trailer coupler labeling application (TCLA). The TCLA including programmatic control logic including: a first control logic for sensing at least one of a hitched state and an unhitched state of the trailer coupler with the vehicle hitch, a second control logic for capturing an optical data with the camera when the vehicle hitch is in the hitched state and in the unhitched state, a third control logic for determining a distance of the vehicle hitch and trailer coupler relative to the camera when the vehicle hitch is in the hitched state, a fourth control logic for sensing the movement of the vehicle relative to the trailer when the vehicle hitch is in the unhitched state, a fifth control logic for determining a location of the trailer coupler when the vehicle hitch is in the unhitched state based, at least in part, on the determined distance of the vehicle hitch and trailer coupler relative to the camera when the vehicle hitch is in the hitched state and the sensed movement of the vehicle relative to the trailer and a sixth control logic that identifies the location of the trailer coupler in the captured optical data and creates a label on the trailer coupler in an image defined by the captured optical data.

In another aspect of the present disclosure the first control logic further includes, a control logic that requests the operator to provide an input to the HMI and a control logic for receiving the operator input and determining the vehicle hitch is in at least one of a hitched state and an unhitched state.

In yet another aspect of the present disclosure, the second control logic further includes control logic for storing the optical data as two-dimensional images of the vehicle hitch in the hitched state and the unhitched state.

In yet another aspect of the present disclosure, the third control logic control logic that performs feature detection and dimensional calculations on the image defined by the captured optical data to determine the location of the vehicle hitch in the image at a time when the vehicle hitch is in a hitched state.

In yet another aspect of the present disclosure, the third control logic further includes control logic that performs feature detection and dimensional calculations on the optical data to determine the location of the vehicle hitch at a time when the vehicle hitch is in an unhitched state.

In yet another aspect of the present disclosure, the sixth control logic further includes control logic that creates the label on the trailer coupler in the image defined by the captured optical data at different times when the vehicle hitch is in the unhitched state.

In yet another aspect of the present disclosure, a seventh control logic is further included for training a local machine learning algorithm to identify a trailer coupler based on the optical data captured by the camera at different times.

In yet another aspect of the present disclosure, an eighth control logic is further included for sending a set of model parameters of the local machine learning algorithm to the remote computer system.

In yet another aspect of the present disclosure, a ninth control logic is further included for creating one of a plurality global machine learning algorithms on the remote computer system based on the model parameters received by the local machine learning algorithm.

In yet another aspect of the present disclosure, a tenth control logic is further included for grouping each of the plurality of global machine learning algorithms into categories based on at least one of: a vehicle operator provided information, a vehicle information and a contextual information.

In yet another aspect of the present disclosure, an eleventh control logic is further included for storing each of the plurality of global machine learning algorithms in a global machine learning database.

In yet another aspect of the present disclosure, a twelfth control logic is further included for deploying one of the plurality of global machine learning algorithms stored on the global machine learning database to the vehicle based on at least one of: a vehicle operator provided information, a vehicle information and a contextual information.

In yet another aspect of the present disclosure, a method for detecting a trailer coupler on a trailer to assist with the coupling of the trailer coupler to a vehicle hitch on a vehicle is provided. The method includes: providing a human-machine interfaces (HMIs) disposed within the vehicle, providing a camera disposed on the vehicle and detecting an environment surrounding the vehicle, providing a global positioning system (GPS) including one or more GPS satellites for obtaining a vehicle position information, providing a remote computing system, providing a vehicle-to-infrastructure (V2I) communication network, providing one or more controllers, each of the one or more controllers having a processor, a memory, and one or more input/output (I/O) ports, the I/O ports in communication with the one or more sensors, the one or more HMIs, the GPS, and the remote computing system via the V2I communication network. The memory storing a programmatic control logic for sensing at least one of a hitched state and an unhitched state of the trailer coupler with the vehicle hitch using the programmatic control logic, capturing an optical data with the camera when the vehicle hitch is in the hitched state and in the unhitched state using the programmatic control logic, determining a distance of the vehicle hitch and trailer coupler relative to the camera when the vehicle hitch is in the hitched state using the programmatic control logic, sensing the movement of the vehicle relative to the trailer when the vehicle hitch is in the unhitched state using the programmatic control logic, determining a location of the trailer coupler when the vehicle hitch is in the unhitched state based, at least in part, on the determined distance of the vehicle hitch and trailer coupler relative to the camera when the vehicle hitch is in the hitched state and the sensed movement of the vehicle relative to the trailer using the programmatic control logic, and identifying the location of the trailer coupler in the captured optical data and creating a label on the trailer coupler in an image defined by the captured optical data using the programmatic control logic.

In yet another aspect of the present disclosure the method further includes requesting the operator to provide an input to the HMI, and receiving the operator input and determining the vehicle hitch is in at least one of a hitched state and an unhitched state using the programmatic control logic.

In yet another aspect of the present disclosure the method further includes storing the optical data as two-dimensional images of the vehicle hitch in the hitched state and the unhitched state using the programmatic control logic.

In yet another aspect of the present disclosure the method further includes performing feature detection and dimensional calculations on the optical data to determine the location of the vehicle hitch at a time when the vehicle hitch is in a hitched state using the programmatic control logic; and performing feature detection and dimensional calculations on the optical data to determine the location of the trailer coupler at a time when the vehicle hitch is in an unhitched state using the programmatic control logic.

In yet another aspect of the present disclosure the method further includes creating the label on the trailer coupler in the image defined by the captured optical data at different times when the vehicle hitch is in the unhitched state using the programmatic control logic.

In yet another aspect of the present disclosure the method further includes training a local machine learning algorithm to identify a trailer coupler based on the optical data captured by the camera at different times using the programmatic control logic and sending a set of model parameters of the local machine learning algorithm to the remote computer system using the programmatic control logic.

In yet another aspect of the present disclosure the method further includes creating one of a plurality global machine learning algorithms on the remote computer system based on the model parameters received by the local machine learning algorithm using the programmatic control logic.

In yet another aspect of the present disclosure the method further includes grouping each of the plurality of global machine learning algorithms into categories based on at least one of: a vehicle operator provided information, a vehicle information and a contextual information, storing each of the plurality of global machine learning algorithms a global machine learning database and deploying one of the plurality of global machine learning algorithms stored on the global machine learning database to the vehicle based on at least one of: a vehicle operator provided information, a vehicle information and a contextual information.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
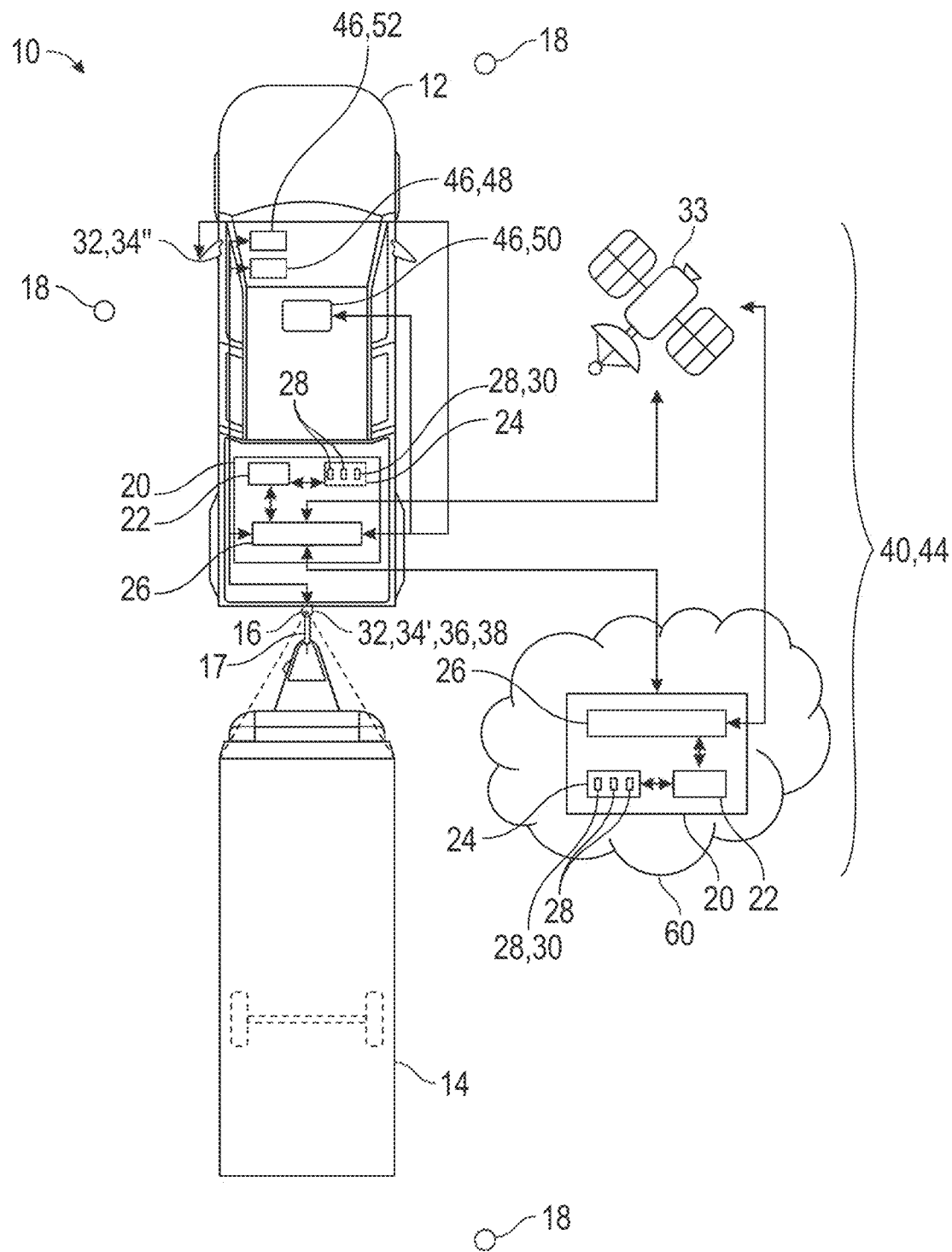
FIG. 1 is a schematic view of a system and method to provide trailer coupler identification and labeling, in accordance with an exemplary embodiment.

Referring to FIG. 1, a schematic diagram of a system 10 for locating and marking or labeling a trailer coupler is shown. The system 10 includes a vehicle 12 and a trailer 14 attached via a hitch 16 to the vehicle 12. While the vehicle 12 is shown as a passenger car or sport utility vehicle (SUV), it should be appreciated that the vehicle 12 may be any type of vehicle without departing from the scope or intent of the present disclosure. In some examples, the vehicle 12 may be a car, a truck, an SUV, a bus, a semi tractor, a tractor used in farming or construction or the like, a pushback tractor or tug, a baggage tractor or cargo tow tractor, or the like. Likewise, while the trailer 14 shown in FIG. 1 is a multi-axle trailer, the trailer 14 may be any of a wide variety of trailer 14 types without departing from the scope or intent of the present disclosure. In some examples, the trailer 14 may be an enclosed or open-air trailer 14 including flatbed trailers, dry vans, refrigerated trailers, lowboy trailers, fifth wheel campers, gooseneck trailers, luggage or cargo trailers, or the like. In further examples, the trailer 14 may be another vehicle 12 as described above, or a vehicle 12 such as a plane, helicopter, or other such aircraft. That is, a vehicle 12 may tow another vehicle 12 as a trailer 14, and multiple trailers 14 may be towed together in single file, or in parallel with one another.

The trailer 14 is removably affixed or mounted to the vehicle 12 via a hitch 16 on the vehicle 12 and a trailer coupler 17 on the trailer 14. The hitch 16 and trailer coupler 17 allows rotational movement of the trailer 14 relative to the vehicle 12, thus providing the trailer 14 and vehicle 12 means to negotiate turns while in motion. The hitch 16 depicted in FIG. 1 is a ball hitch, however it should be appreciated that other forms of hitches 16 may be used without departing from the scope or intent of the present disclosure. For example, the hitch 16 may be a ball hitch, a receiver hitch, a fifth wheel hitch, a gooseneck hitch, a pintle hitch, a bumper hitch, a weight distribution hitch, or the like. In several aspects, the hitch 16 operates as a pivot. It is desirable while attempting to hitch the trailer to the vehicle to manage vehicle 12 such that the vehicle 12 does not physically contact the trailer or obstacles in the environmental 18 surrounding the vehicle 12 and trailer when the vehicle is in reverse and backing towards the trailer 14.

The system 10 includes one or more control modules 20. The control module 20 is a non-generalized, electronic control device having a preprogrammed digital computer or processor 22, non-transitory computer readable medium or memory 24 used to store data such as control logic, software applications, instructions, computer code, data, lookup tables, etc., and one or more input/output (I/O) ports 26. Computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium or memory 24 includes media where data can be permanently stored and media where data can be stored and later overwritten, such as a rewritable optical disc or an erasable memory device. Computer code includes any type of program code, including source code, object code, and executable code. The processor 22 is configured to execute the code or instructions. In some examples, the control module 20 may be a dedicated Wi-Fi controller or an engine control module, a transmission control module, a body control module, an infotainment control module, etc. The I/O ports 26 are configured to communicate via wired or wireless connections using Wi-Fi protocols under IEEE 802.11x, Bluetooth communication protocols, radio frequency (RF) protocols, or the like. In some examples, the control module 20 further includes one or more applications 28. An application 28 is a software program configured to perform a specific function or set of functions. The application 28 may include one or more computer programs, software components, sets of instructions, procedures, functions, objects, classes, instances, related data, or a portion thereof adapted for implementation in a suitable computer readable program code. The applications 28 may be stored within the memory 24 or in additional or separate memory. Examples of the applications 28 include audio or video streaming services, games, browsers, social media, suspension and engine control programs, body control programs, advanced driver assistance system (ADAS) programs, and the like. In a particular application 28 of the present disclosure, the system 10 includes a trailer coupler labeling application (TCLA) 30.

System 10 further includes one or more sensors 32. The sensors 32 produce real-time positioning information regarding the location and/or movement of the vehicle 12. The sensors 32 may include any of a wide variety of different types of sensors 32, including but not limited to: cameras 34, Light Detection and Ranging (LiDAR) sensors, Radio Detection and Ranging (RADAR) sensors, Sound Navigation and Ranging (SONAR) sensors, ultrasonic sensors, or combinations thereof. Further, the sensors 32 may have the ability to communicate with a Global Positioning System (GPS), and in particular, image data collected by satellites 33 in orbit around Earth, in order to more accurately and precisely report the location of the vehicle 12. In further examples, the sensors 32 may include wheel speed sensors disposed on one or more of the vehicle 12 and the trailer 14, a hitch angle estimation sensor 36 or a hitch angle estimation algorithm such as that taught by U.S. Pat. Nos. 10,346,705 and 11,560,026.

In additional examples, the sensors 32 may include inertial measurement units (IMUs) 38. IMUs 38 measure and report attitude or position, linear velocity, acceleration, and angular rates relative to a global reference frame using a combination of some or all of the following: accelerometers, gyroscopes, and magnetometers. In some examples, IMUs 38 may also utilize global positioning system (GPS) data to indirectly measure attitude or position, velocity, acceleration, and angular rates. When used in the system 10 of the present disclosure, the IMUs 38 measure and report attitude or position, linear velocity, acceleration, and angular rates the vehicle 12 and camera 34. The control modules 20 and sensors 32 may be linked to and communicate on one or more communications networks 40 including one or more of a vehicle-to-vehicle (V2V) communications network, a vehicle-to-infrastructure (V2I) communications network 44, or the like. For the sake of brevity, the term "infrastructure" is used to collectively refer to network entities capable of ad hoc wireless communications in the direct link or side link, and the cellular communication network owned by service providers, hence vehicle-to-network (V2N) communication is also intended to be included in the scope of V2I.

Figure 2:
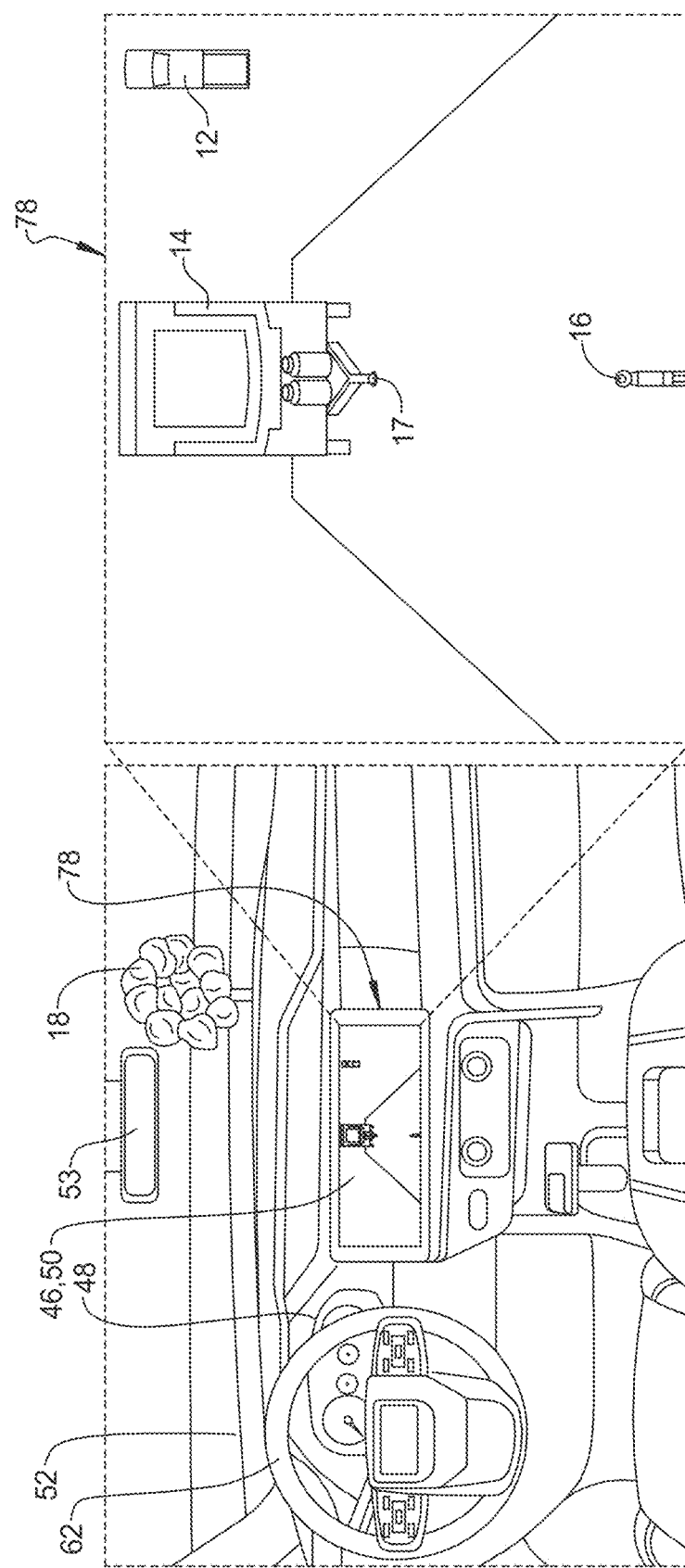
FIG. 2 is a perspective interior view of a vehicle, including a human-machine interface (HMI) displaying a view of an environment surrounding a vehicle utilizing the system and method to provide trailer coupler labeling of FIG. 1, in accordance with an exemplary embodiment.

Referring now to FIG. 2 and with continuing reference to FIG. 1, the system 10 further includes an in-vehicle 12 human-machine interface (HMI) 46 to interact with vehicle 12 operators. In several aspects, the HMI 46 includes one or more devices capable of interacting with the vehicle 12 operator, such as a screen disposed within the vehicle 12 such as an instrument cluster 48, an infotainment screen 50, a heads-up display (HUD) 52, an interior rear-view screen such as a rear-view mirror augmented by a screen 53, or the like. However, it should be appreciated that other HMIs 46 are considered herein as well. For example, the HMI 46 may be a mobile device, such as a tablet computer, a mobile phone, or the like, and the HMI 46 may be provided by the vehicle 12 operator and temporarily mounted to or disposed on an interior passenger compartment component of the vehicle 12. In several aspects, the HMI 46 communicates with the control modules 20 via the I/O ports 26 and sends information to and receives information from the I/O ports 26 of the control modules 20, including during operation of the TCLA 30.

For example, the TCLA 30 in combination with other vehicle control applications may assist a vehicle 12 operator in maneuvering vehicle 12 by turning a steering wheel 62 to back up towards trailer 14 to attach, hitch or couple the trailer 14 to the vehicle 12. More specifically, the TCLA 30 includes a plurality of sub-routines or control logic portions that are stored in memory 24 of the control modules 20 and executed by the processor 22 while data is received, via the I/O ports 26, from the sensors 32 such as the cameras 34, hitch angle estimation sensor 36, IMUs 38, and/or satellites 33 reporting GPS data. The TCLA 30 further includes a plurality of subroutines or control logic portions that cause data to be transmitted from the control modules 20 to the HMI 46.

Figure 3:
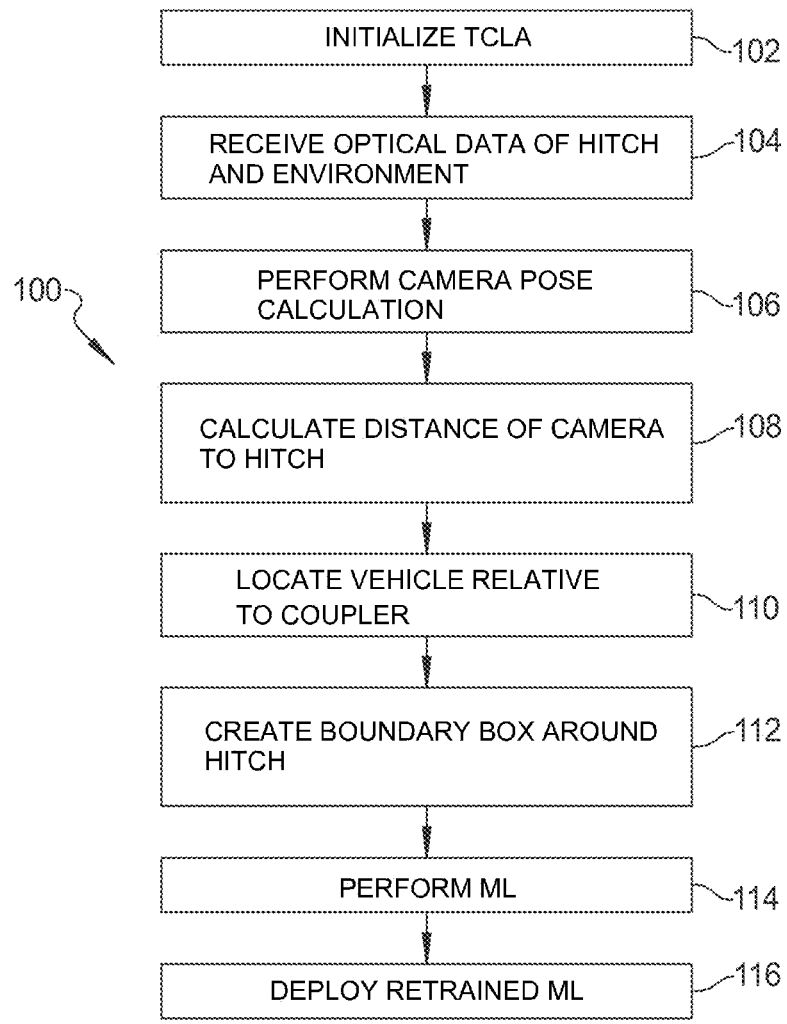
FIG. 3 is a flowchart of a method for implementing the trailer coupler labeling application, in accordance with an exemplary embodiment.

With reference now to FIG. 3, a flowchart of a method 100 of the TCLA 30 is shown, in accordance with the present disclosure. In several aspects, the TCLA 30 is initialized at block 102 upon the occurrence of one or more specific conditions within a first control logic. These conditions include manual initialization by a vehicle 12 operator via the HMI 46 or the operation of a physical button disposed in the interior of the vehicle 12. In further examples, the conditions may be automatically satisfied by sensors 32 detecting that a trailer 14 is attached coupled to the vehicle 12.

Upon receiving confirmation, at block 102, that the vehicle 12 operator desires to engage the TCLA 30, the control module 20 executes a control logic to utilize the HMI 46 to present a prompt to the vehicle 12 operator for confirmation that the vehicle 12 operator desires that the TCLA 30 be engaged. The prompt may be displayed on-screen on the HMI 46, dictated audibly through a stereo system of the vehicle 12, or the like.

Figure 4:
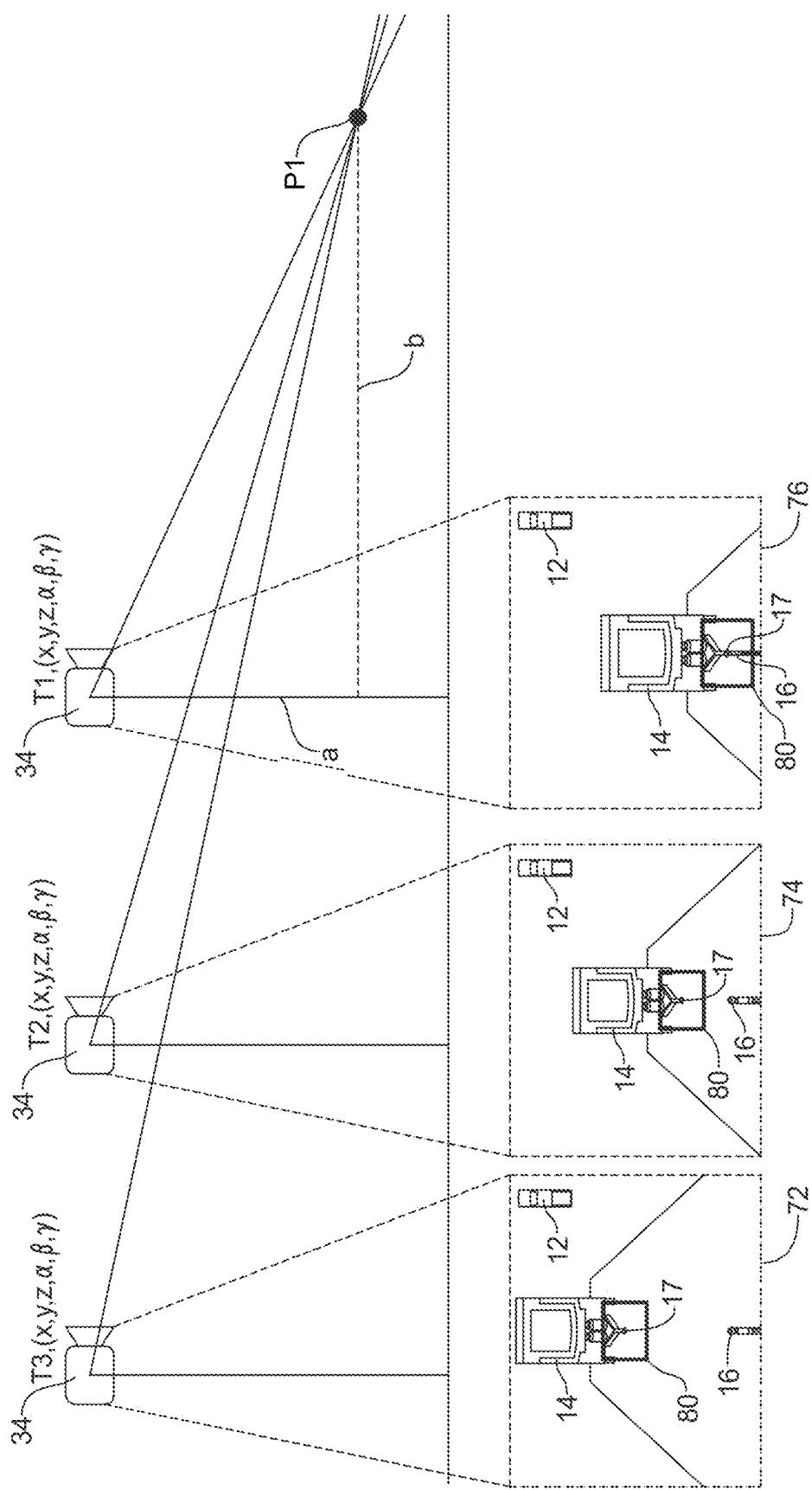
FIG. 4 is a schematic diagram showing camera poses as the vehicle and the camera move over time, in accordance with an exemplary embodiment.

With continuing reference to FIG. 3 and now with additional reference to FIG. 4, the TCLA 30 uses a visual simultaneous localization and mapping (vSLAM) algorithm to estimate sensor (i.e. camera 34) motion and reconstruct structure in environment 18. More specifically, the vSLAM algorithm uses visual or optical data captured by the camera 34 within a second control logic, at block 104. For example, camera poses 72, 74, 76 as the vehicle 12 and the camera 34 move over time t1, t2, t3 are captured, as illustrated in FIG. 4. The vSLAM algorithm provides estimates for the position and orientation of the camera on vehicle 12 with respect to the environment 18 while simultaneously mapping the environment. The camera 34 captures images of the environment 18, so that the vSLAM algorithm can extract features, such as the trailer coupler 17 and trailer hitch 16. The features, for example, the trailer coupler 17 is matched across consecutive frames to estimate the motion of the camera 34 and the 3D position of the trailer coupler 17 and/or other features in the environment 18. The camera poses 72, 74, 76 captured by camera 34 and the 3D features form a map of the environment 18 that is updated as new images are captured and processed by system 10. The vSLAM algorithm also performs loop closure detection for recognizing that the camera 34 is returning to a previously captured environment 18 and corrects the drift in the map and the camera pose.

At block 106, the vSLAM algorithm uses the optical data received at block 104 to perform camera pose calculations within a third control logic. At time t1 the vehicle 12 is hitched to the trailer 14 (the hitched state). At block 108, in the hitched state the location of the hitch 16 relative to camera 34, distance between camera and "p1", may be calculated given that both distance "a" and distance "b" are known. Distance "a" is the vertical height of the camera 34 in the vehicle and distance "b" is the horizontal distance from the camera to the hitch 16 since the vehicle 12 and trailer 14 are in the hitched state distance "b" is also the location of the trailer coupling 17 relative to the camera 34 (i.e. p1).

At block 110, the vehicle 12 is located with sensors 32 in an X, Y, Z coordinate system by measuring the vehicle dynamics, within a fourth control logic, as the vehicle 12 moves over time ($\alpha$=pitch, $\beta$=roll, $\gamma$=yaw and angular rotations thereof). Within a fifth control logic, the vSLAM algorithm may be used to locate the trailer coupler 17 in each of the camera poses 72, 74, 76 for each time t1, t2, and t3, thus projecting the coupler 3D position in each of the images of each of the camera poses 72, 74, 76 to a 2D image, as shown in FIG. 4. Environmental scan data received from the sensors 32 is then processed in one or more image or video-processing algorithms included within the fifth control logic. In several aspects, the image or video-processing algorithms may include one or more of image capture algorithms that capture an image of the trailer 14 and trailer coupler 17 and perform image distortion corrections as needed to correct for camera 34 lens shape, and the like. Feature detection algorithms, such as Canny Edge algorithms, may then be used to perform feature detection within the image of the trailer 14 and trailer coupler 17.

At block 112 and within a sixth control logic, TCLA 30 creates a boundary box or label 80 around the trailer coupler 17 at the reprojected position or location in the 2D images 72, 74 and 76 defined by the captured data (received at block 104), as shown in FIG. 4. The label 80 locates the trailer coupler 17 in the 2D image in different kinds of conditions including, for example, low lighting conditions.

In several aspects, at block 114, a remote cloud-based computing and/or storage system such as the cloud computing server 60 (shown in FIG. 1) having one or more control modules 20 is utilized to perform machine learning (ML) training to improve trailer coupler 17 object detection accuracy of the TCLA 30. At block 116, the re-trained ML algorithms are deployed to individual vehicles to enhance trailer coupler 17 identification and labeling, as will be described in further detail below.

Figure 5:
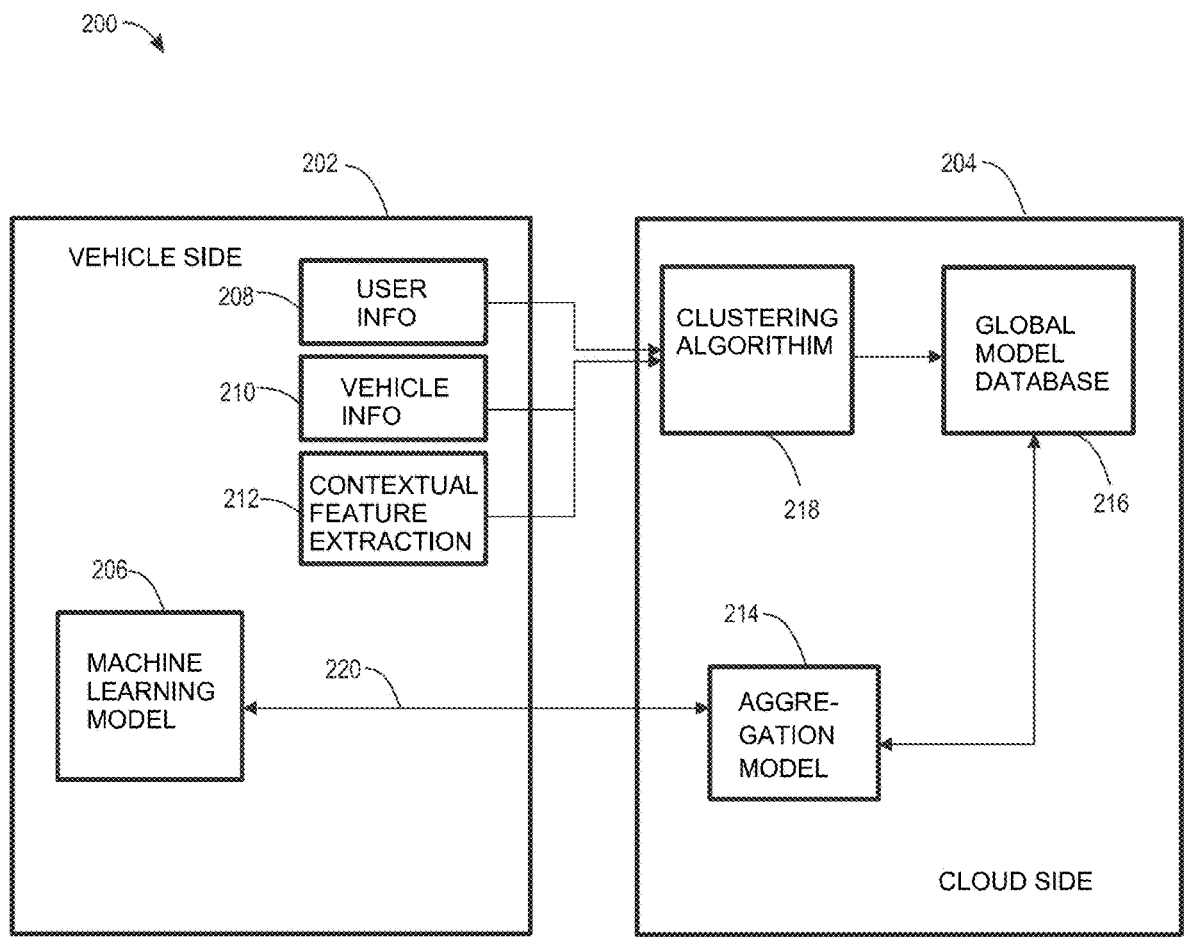
FIG. 5 is a block diagram of a process for enhancing the local machine learning model utilized by the trailer coupler labeling application in the vehicle, in accordance with an exemplary embodiment.

Referring now to FIG. 5, a block diagram of a process 200 for enhancing a local machine learning model utilized by the TCLA 30 in vehicle 12 within a seventh control logic, in accordance with the present disclosure. The process 200 includes a vehicle-side subprocess 202 and a cloud-side subprocess 204. Vehicle-side subprocess 202 includes a local federated machine learning model 206 which is a machine learning model (i.e. a deep neural network (DNN)) that resides in the memory 24 of system 10 and utilized by the TCLA 30. The local federated machine learning model 206 uses the raw data, such as images of the trailer coupler 17 and label 80 of the coupler 17 collected locally on the vehicle 12 to perform machine learning training to enable the TCLA 30 to recognize trailer couplers of different types and under different conditions.

In a non-limiting example, the local federated machine learning model 206 includes multiple layers, including an input layer and an output layer, as well as one or more hidden layers. The input layer receives the optical scans of the trailer coupler 17 as inputs. The optical scans are received from the vehicle 12 at different times and locations of the vehicle 12 relative to the trailer 14. Moreover, the optical scans may include images of different types of trailer hitches 16 and trailer couplers 17. These inputs are then passed on to the hidden layers. Each hidden layer applies a transformation (e.g., a non-linear transformation) to the data and passes the result to the next hidden layer until the final hidden layer. The output layer produces the final predicted trailer coupler 17 location within the image. To train the ML algorithm, a dataset of inputs and their corresponding trailer coupler 17 location is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data. After sufficient training of the ML algorithm, the federated learning model 206 is capable of accurately and precisely determining trailer couplers 17 within an image based on the images captured by vehicle 12 at different times in the hitched state and in the unhitched state relative to trailer 14. By adjusting the weights between the nodes in each hidden layer during training, the algorithm "learns" to recognize patterns in the data that are indicative trailer couplers 17 in an image in different contexts. Advantageously, once trained the vehicle-side subprocess 202 only uploads to the cloud computing server 60 the model parameters 220 of the locally trained federated machine learning model 206 within an eighth control logic.

Moreover, vehicle-side subprocess 202 includes user provided information 208, vehicle specific information 210, and contextual feature extraction 212. User provided information 208 may include but not limited to the type of hitch 16 or ball the user or vehicle operator is using (i.e., pinnal hitch, ball size of 2", 2⅝", etc.), type of trailer 14, type of trailer coupler 17 and user vehicle 12 modifications. Vehicle specific information 210 may include but not limited to the year, make and model of the vehicle 12, the trim package on the vehicle 12, other vehicle optional equipment or the like. Contextual feature extraction 212 utilizes the sensors 32 to capture and extract information from the camera poses 72, 74, and 76 regarding the environment 18 including but not limited to lighting conditions.

Cloud-side subprocess 204 includes a federated aggregation model 214, a global learning model database 216 and a context awareness clustering algorithm 218. Federated aggregation model 214 receives the local model parameters 220 of the local federated learning model 206. The federated aggregation model 214 builds multiple machine learning models using the model parameters 220 received from the local federated machine learning model 206 and stores the multiple machine learning models in the global model database 216 via a ninth control logic. The global model database 216 contains global machine learning models that are separated, stored and categorized based on inputs received by a context-awareness clustering algorithm 218. Context-awareness clustering algorithm 218 receives contextual features provided by the user provided information 208, vehicle specific information 210, and contextual feature extraction 212 from the vehicle-side subprocess 202 to group or cluster the machine learning models stored in the global model database 216. Accordingly, multiple global machine learning models are created, stored and grouped according to the contextual features via a tenth control logic.

In some aspects of the present disclosure, the model parameters 220 of the local federated machine learning model 206 are transmitted to cloud-side subprocess 204 for aggregation. The federated aggregation process 214 uses the contextual features information to search the global database 216 to perform global aggregation of the machine learning models such that the machine learning model is grouped with other machine learning models developed based on the same or similar contextual features. If a machine learning model does not exist that is based on the same or similar contextual features, a new machine learning model is created by cloud-side subprocess 204 and then stored in the global model database 216 using an eleventh control logic. In several aspects of the present disclosure, the machine learning models stored in the global model database 216 are searched according to contextual features and deployed only to vehicles that have the same or similar contextual features. Accordingly, the process 200 deploys different machine learning models developed in the cloud computing server 60 to vehicles that have matching contextual features to prevent corruption of the locally stored machine learning models resident of the vehicle 12 via a twelfth control logic.

The system 10 and method 200 for providing trailer coupler 17 locating and labeling of the present disclosure offers several advantages over prior art systems. These include: improving trailer coupler 17 identification accuracy from location-to-location while utilizing preexisting hardware, reducing computational burdens, and reducing component complexity while decreasing trailer hitching difficulty by identifying, locating and labeling the trailer coupler 17 on the trailer 14, and thereby improving customer confidence and satisfaction.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for locating a trailer coupler on a trailer to assist with the coupling of the trailer coupler to a vehicle hitch on a vehicle, the system comprising:
   a human-machine interface (HMI) disposed within the vehicle;
   a camera disposed on the vehicle and detecting an environment surrounding the vehicle;
   a global positioning system (GPS) including one or more GPS satellites for obtaining a vehicle position information;
   a remote computing system;
   a vehicle-to-infrastructure (V2I) communication network;
   a controller having a processor, a memory, and one or more input/output (I/O) ports, the I/O ports in communication with the camera, the HMI, the GPS, and the remote computing system via the V2I communication network; the memory storing programmatic control logic; the processor executing the programmatic control logic; the programmatic control logic including a trailer coupler labeling application (TCLA) including:
   a first control logic for sensing, via the camera, at least one of a hitched state and an unhitched state of the trailer coupler with the vehicle hitch;
   a second control logic for capturing an optical data with the camera when the vehicle hitch is in the hitched state and in the unhitched state;
   a third control logic for determining a distance of the vehicle hitch and trailer coupler relative to the camera when the vehicle hitch is in the hitched state;
   a fourth control logic for sensing, via the camera, the movement of the vehicle relative to the trailer when the vehicle hitch is in the unhitched state;
   a fifth control logic for determining a location of the trailer coupler when the vehicle hitch is in the unhitched state based, at least in part, on the determined distance of the vehicle hitch and trailer coupler relative to the camera when the vehicle hitch is in the hitched state and the sensed movement of the vehicle relative to the trailer; and
   a sixth control logic that identifies the location of the trailer coupler in the captured optical data and creates a label on the trailer coupler in an image defined by the captured optical data.

2. The system of claim 1, wherein the first control logic further comprises:

requesting that the operator to provide an input to the HMI; and receiving the operator input and determining the vehicle hitch is in at least one of a hitched state and an unhitched state.

3. The system of claim 1, wherein the second control logic further comprises:

storing the optical data as two-dimensional images of the vehicle hitch in the hitched state and the unhitched state.

4. The system of claim 1, wherein the third control logic further comprises:

performing feature detection and dimensional calculations on the image defined by the captured optical data to determine the location of the vehicle hitch in the image at a time when the vehicle hitch is in a hitched state.

5. The system of claim 1, wherein the third control logic further comprises:

performing feature detection and dimensional calculations on the image defined by the captured optical data to determine the location of the trailer coupler in the image at a time when the vehicle hitch is in an unhitched state.

6. The system of claim 5, wherein the sixth control logic further comprises:

creating the label on the trailer coupler in the image defined by the captured optical data at different times when the vehicle hitch is in the unhitched state.

7. The system of claim 1, further comprising a seventh control logic for training a local machine learning algorithm to identify a trailer coupler based on the optical data captured by the camera at different times.

8. The system of claim 7, further comprising an eighth control logic for sending a set of model parameters of the local machine learning algorithm to the remote computer system.

9. The system of claim 8, further comprising a ninth control logic for creating one of a plurality global machine learning algorithms on the remote computer system based on the model parameters received by the local machine learning algorithm.

10. The system of claim 9, further comprising a tenth control logic for grouping each of the plurality of global machine learning algorithms into categories based on at least one of: a vehicle operator provided information, a vehicle information and a contextual information.

11. The system of claim 10, further comprising an eleventh control logic for storing each of the plurality of global machine learning algorithms in a global machine learning database.

12. The system of claim 11, further comprising a twelfth control logic for deploying one of the plurality of global machine learning algorithms stored on the global machine learning database to the vehicle based on at least one of: a vehicle operator provided information, a vehicle information and a contextual information.

13. A method for locating a trailer coupler on a trailer to assist with the coupling of the trailer coupler to a vehicle hitch on a vehicle, the method comprising:

providing a human-machine interface (HMI) disposed within the vehicle;

providing a camera disposed on the vehicle and detecting an environment surrounding the vehicle;

providing a global positioning system (GPS) including one or more GPS satellites for obtaining a vehicle position information;

providing a remote computing system;

providing a vehicle-to-infrastructure (V2I) communication network;

providing a controller having a processor, a memory, and one or more input/output (I/O) ports, the I/O ports in communication with the camera, the HMI, the GPS, and the remote computing system via the V2I communication network; the memory storing a programmatic control logic;

sensing, via the camera, at least one of a hitched state and an unhitched state of the trailer coupler with the vehicle hitch using the programmatic control logic;

capturing an optical data with the camera when the vehicle hitch is in the hitched state and in the unhitched state using the programmatic control logic;

determining a distance of the vehicle hitch and trailer coupler relative to the camera when the vehicle hitch is in the hitched state using the programmatic control logic;

sensing, via the camera, the movement of the vehicle relative to the trailer when the vehicle hitch is in the unhitched state using the programmatic control logic;

determining a location of the trailer coupler when the vehicle hitch is in the unhitched state based, at least in part, on the determined distance of the vehicle hitch and trailer coupler relative to the camera when the vehicle hitch is in the hitched state and the sensed movement of the vehicle relative to the trailer using the programmatic control logic; and identifying the location of the trailer coupler in the captured optical data and creating a label on the trailer coupler in an image defined by the captured optical data using the programmatic control logic.

14. The method of claim 13, further comprising:

requesting the operator to provide an input to the HMI; and receiving the operator input and determining the vehicle hitch is in at least one of a hitched state and an unhitched state using the programmatic control logic.

15. The method of claim 14, further comprising:

storing the optical data as two-dimensional images of the vehicle hitch in the hitched state and the unhitched state.

16. The method of claim 15, further comprising:

performing feature detection and dimensional calculations on the image defined by the captured optical data to determine the location of the vehicle hitch in the image at a time when the vehicle hitch is in a hitched state using the programmatic control logic; and performing feature detection and dimensional calculations on the image defined by the captured optical data to determine the location of the trailer coupler in the image at a time when the vehicle hitch is in an unhitched state using the programmatic control logic.

17. The method of claim 15, further comprising:

creating the label on the trailer coupler in the image defined by the captured optical data at different times when the vehicle hitch is in the unhitched state.

18. The method of claim 15, further comprising:

training a local machine learning algorithm to identify a trailer coupler based on the optical data captured by the camera at different times using the programmatic control logic; and sending a set of model parameters of the local machine learning algorithm to the remote computer system using the programmatic control logic.

19. The method of claim 18, further comprising:
creating one of a plurality global machine learning algorithms on the remote computer system based on the model parameters received by the local machine learning algorithm using the programmatic control logic.

20. The method of claim 19, further comprising:
grouping each of the plurality of global machine learning algorithms into categories based on at least one of: a vehicle operator provided information, a vehicle information and a contextual information;

storing each of the plurality of global machine learning algorithms a global machine learning database and deploying one of the plurality of global machine learning algorithms stored on the global machine learning database to the vehicle based on at least one of: a vehicle operator provided information, a vehicle information and a contextual information.

\* \* \* \* \*